(12) United States Patent
McGeachie

(10) Patent No.: US 9,092,016 B2
(45) Date of Patent: *Jul. 28, 2015

(54) UNIVERSAL VALIDATION MODULE FOR ACCESS CONTROL SYSTEMS

(71) Applicant: Assa Abloy AB, Stockholm (SE)

(72) Inventor: John J. McGeachie, North Reading, MA (US)

(73) Assignee: Assa Abloy AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/673,091

(22) Filed: Nov. 9, 2012

(65) Prior Publication Data

US 2013/0194064 A1    Aug. 1, 2013

Related U.S. Application Data

(63) Continuation of application No. 12/589,883, filed on Oct. 29, 2009, now Pat. No. 8,319,606.

(51) Int. Cl.

| | |
|---|---|
| *G06F 7/04* | (2006.01) |
| *G05B 19/00* | (2006.01) |
| *B60R 25/00* | (2013.01) |
| *H04L 29/06* | (2006.01) |
| *G05B 1/00* | (2006.01) |
| *G06F 21/31* | (2013.01) |
| *G06F 21/32* | (2013.01) |
| *G06F 21/33* | (2013.01) |
| *G06F 21/34* | (2013.01) |
| *G07C 9/00* | (2006.01) |

(52) U.S. Cl.
CPC *G05B 1/00* (2013.01); *G06F 21/31* (2013.01); *G06F 21/32* (2013.01); *G06F 21/335* (2013.01); *G06F 21/34* (2013.01); *G07C 9/00103* (2013.01); *H04L 63/0861* (2013.01); *G06F 2221/2153* (2013.01); *G07C 9/00087* (2013.01); *G07C 2209/02* (2013.01); *H04L 63/0823* (2013.01)

(58) Field of Classification Search
USPC .......... 340/5.6, 5.81, 665, 545.7, 573.1, 5.65; 726/2, 7, 27, 3, 4, 5, 19
See application file for complete search history.

(56) References Cited

U.S. PATENT DOCUMENTS

| | | | |
|---|---|---|---|
| 6,463,537 B1 * | 10/2002 | Tello | 713/182 |
| 6,981,142 B1 | 12/2005 | Gulcu | |
| 7,051,206 B1 * | 5/2006 | Giest et al. | 713/176 |
| 7,697,737 B2 * | 4/2010 | Aull et al. | 382/124 |

(Continued)

*Primary Examiner* — Fekadeselassie Girma

(74) *Attorney, Agent, or Firm* — Muirhead and Saturnelli, LLC

(57) ABSTRACT

A validation module provides for the upgrading of a physical access control system (PACS) to full HSPD-12 compliance without requiring modification or replacement of the existing PACS. The validation module may contain all of the validation functionality required by federal specifications and technical requirements. The validation module may be installed between an existing PACS panel and a supported card/biometric reader. Readers may be selected based on assurance level requirements, e.g., contactless or contact readers for low and medium assurance level areas and full biometric readers for high assurance areas. The validation module may validate a card according to the assurance level setting, extract ID information from data on the card and then pass the ID information to the PACS panel for an access decision. Cardholder data captured by one validation module may be distributed to other validation modules of the PACS using a management station.

12 Claims, 6 Drawing Sheets

(56) References Cited

U.S. PATENT DOCUMENTS

| | | | |
|---|---|---|---|
| 7,716,489 B1* | 5/2010 | Brandt et al. | 713/180 |
| 7,735,728 B2* | 6/2010 | Wallerstorfer | 235/382 |
| 8,016,191 B2* | 9/2011 | Bonalle et al. | 235/379 |
| 8,074,271 B2 | 12/2011 | Davis et al. | |
| 8,089,341 B2* | 1/2012 | Nakagawa et al. | 340/5.7 |
| RE43,157 E* | 2/2012 | Bishop et al. | 235/379 |
| 8,294,552 B2* | 10/2012 | Beenau et al. | 340/5.83 |
| 8,452,958 B2* | 5/2013 | Sun et al. | 713/158 |
| 8,489,513 B2* | 7/2013 | Bishop et al. | 705/67 |
| 8,498,883 B2* | 7/2013 | Lorsch | 705/2 |
| 8,548,927 B2* | 10/2013 | Beenau et al. | 705/76 |
| 8,578,472 B2 | 11/2013 | Davis et al. | |
| 2002/0138442 A1* | 9/2002 | Hori et al. | 705/59 |
| 2002/0184501 A1* | 12/2002 | Bin Abdul Rahman et al. | 713/173 |
| 2003/0086591 A1* | 5/2003 | Simon | 382/115 |
| 2004/0006591 A1* | 1/2004 | Matsui et al. | 709/203 |
| 2004/0064335 A1* | 4/2004 | Yang | 705/1 |
| 2005/0114653 A1* | 5/2005 | Sudia | 713/158 |
| 2005/0120210 A1* | 6/2005 | Behbehani | 713/168 |
| 2005/0204167 A1* | 9/2005 | Conlin et al. | 713/201 |
| 2006/0077034 A1* | 4/2006 | Hillier | 340/5.61 |
| 2006/0226951 A1* | 10/2006 | Aull et al. | 340/5.61 |
| 2008/0016370 A1* | 1/2008 | Libin et al. | 713/185 |
| 2008/0046984 A1* | 2/2008 | Bohmer et al. | 726/5 |
| 2008/0134341 A1* | 6/2008 | Sakamura et al. | 726/27 |
| 2008/0163361 A1* | 7/2008 | Davis et al. | 726/19 |
| 2009/0153290 A1* | 6/2009 | Bierach | 340/5.6 |
| 2009/0300744 A1* | 12/2009 | Guo et al. | 726/7 |
| 2010/0039238 A1* | 2/2010 | Chang | 340/10.31 |
| 2010/0212007 A1* | 8/2010 | Conlin et al. | 726/16 |
| 2013/0194064 A1* | 8/2013 | McGeachie | 340/5.6 |

* cited by examiner

UNIVERSAL VALIDATION MODULE FOR ACCESS CONTROL SYSTEMS

RELATED APPLICATIONS

This application is a continuation of U.S. application Ser. No. 12/589,883 filed on Oct. 29, 2009 (now U.S. Pat. No. 8,319,606), which is incorporated by reference herein.

TECHNICAL FIELD

This application is related to the field of access control and, more particularly, to a system for identity verification.

BACKGROUND OF THE INVENTION

Homeland Security Presidential Directive 12 (HSPD-12), dated Aug. 27, 2004, entitled "Policy for a Common Identification Standard for Federal Employees and Contractors" directs the promulgation of a federal standard for secure and reliable forms of identification for federal employees. In accordance with HSPD-12, the Federal Information Processing Standards 201-1 (FIPS 201-1), "Personal Identity Verification (PIV) of Federal Employees and Contractors," U.S. Dept. of Commerce, May 2001, which is incorporated herein by reference, specifies the architecture and technical requirements for a common identification standard for federal employees and contractors in connection with the personal identity verification of individuals seeking physical access to federally controlled government facilities and electronic access to government information systems. (See also: National Institute of Standards and Technology (NIST) Special Publication (SP) 800-116, MacGregor et al., "A Recommendation for the Use of PIV Credentials in Physical Access Control Systems (PACS)," U.S. Dept. of Commerce, November 2008, and "Transportation Worker Identification Credential (TWIC) Reader Hardware And Card Application Specification," Transportation Security Administration, Dept. of Homeland Security, May 30, 2008, which are both incorporated herein by reference.) Providing identity verification functionality that complies with federal requirements is important for ensuring security assurance in connection with controlling access according to required security levels, procedures and site requirements.

Accordingly, it would be desirable to provide a system for identity verification that may be efficiently and flexibly implemented in access control systems in accordance with security requirements.

SUMMARY OF THE INVENTION

According to the system described herein, a validation device for an access control system includes modular communication interfaces that provide coupling to the access control system, at least one processor, and a computer readable storage medium storing executable code that is executable by the at least one processor. The computer readable storage medium includes executable code that receives cardholder data in connection with an access request at an access point controlled by the access control system. Executable code is included that validates the cardholder data. Executable code is included that extracts ID information from the validated cardholder data. executable code that sends the extracted ID information to an access decision component of the access control system. The modular communication interfaces may include a first communication port that couples to at least one reader of the access control system and enables the validation device to receive the cardholder data from the at least one reader, a second communication port that couples to the access decision component of the access control system and enables the validation device to send the extracted ID information to the access decision component, and a third communication port that couples to a management station. Executable code may be included that exchanges information with the management station. The executable code that validates the cardholder data may include executable code that authenticates the cardholder data according to an authentication mechanism. The authentication mechanism may be at least one of: cardholder unique identifier (CHUID), card authentication key (CAK), PIV authentication key (PKI), and biometric authentication (BIO). The executable code that validates the cardholder data may perform certificate path discovery and validation to a trusted authority. Executable code may be included that performs enrollment processing for cardholder data that is identified as being used for a first time with the access control system. The enrollment processing may include capturing and storing certificates of the cardholder data that is identified as being used for the first time.

According further to the system described herein, a computer readable storage medium stores executable code executable by the at least one processor, the computer readable storage medium including executable code that receives cardholder data in connection with an access request at an access point controlled by the access control system. Executable code is provided that validates the cardholder data. Executable code is provided that extracts ID information from the validated cardholder data. Executable code is provided that sends the extracted ID information to an access decision component of the access control system. Executable code may be provided that exchanges information with a management station. The executable code that validates the cardholder data may include executable code that authenticates the cardholder data according to an authentication mechanism. The authentication mechanism may be at least one of: cardholder unique identifier (CHUID), card authentication key (CAK), PIV authentication key (PKI), and biometric authentication (BIO). The executable code that validates the cardholder data may perform certificate path discovery and validation to a trusted authority. Executable code may be provided that performs enrollment processing for cardholder data that is identified as being used for a first time with the access control system. The enrollment processing may include capturing and storing certificates of the cardholder data that is identified as being used for the first time.

According further to the system described herein, an access control system includes an access decision component that controls access through an access point, and a reader disposed at the access point that extracts cardholder data from a credential presented at the access point, and a validation module coupled to the card/bio reader and the access decision component. The validation module includes modular communication interfaces that couple the at least one validation module to the access decision component, at least one processor; and a computer readable storage medium storing executable code executable by the at least one processor. The computer readable storage medium includes executable code that receives the cardholder data from the reader. Executable code is provided that validates the cardholder data. Executable code is provided that extracts ID information from the validated cardholder data. Executable code is provided that sends the extracted ID information to the access decision component. The modular communication interfaces may include a first communication port that couples the validation module to the reader and enables the validation module to receive the cardholder data from the reader, and a second communication port that couples the validation module to the access decision component and that enables the validation device to send the extracted ID information to the access decision component. A management station may be coupled to the validation module and coupled to at least one additional validation module, where the management station manages information distributed between the validation module and the at least one additional validation module. An enrollment module may perform enrollment processing for cardholder data that is identified as being used for a first time with the access control system.

BRIEF DESCRIPTION OF THE DRAWINGS

Embodiments of the system described herein are described with reference to the several figures of the drawings which are briefly described as follows.

DETAILED DESCRIPTION OF VARIOUS EMBODIMENTS

Figure 1:
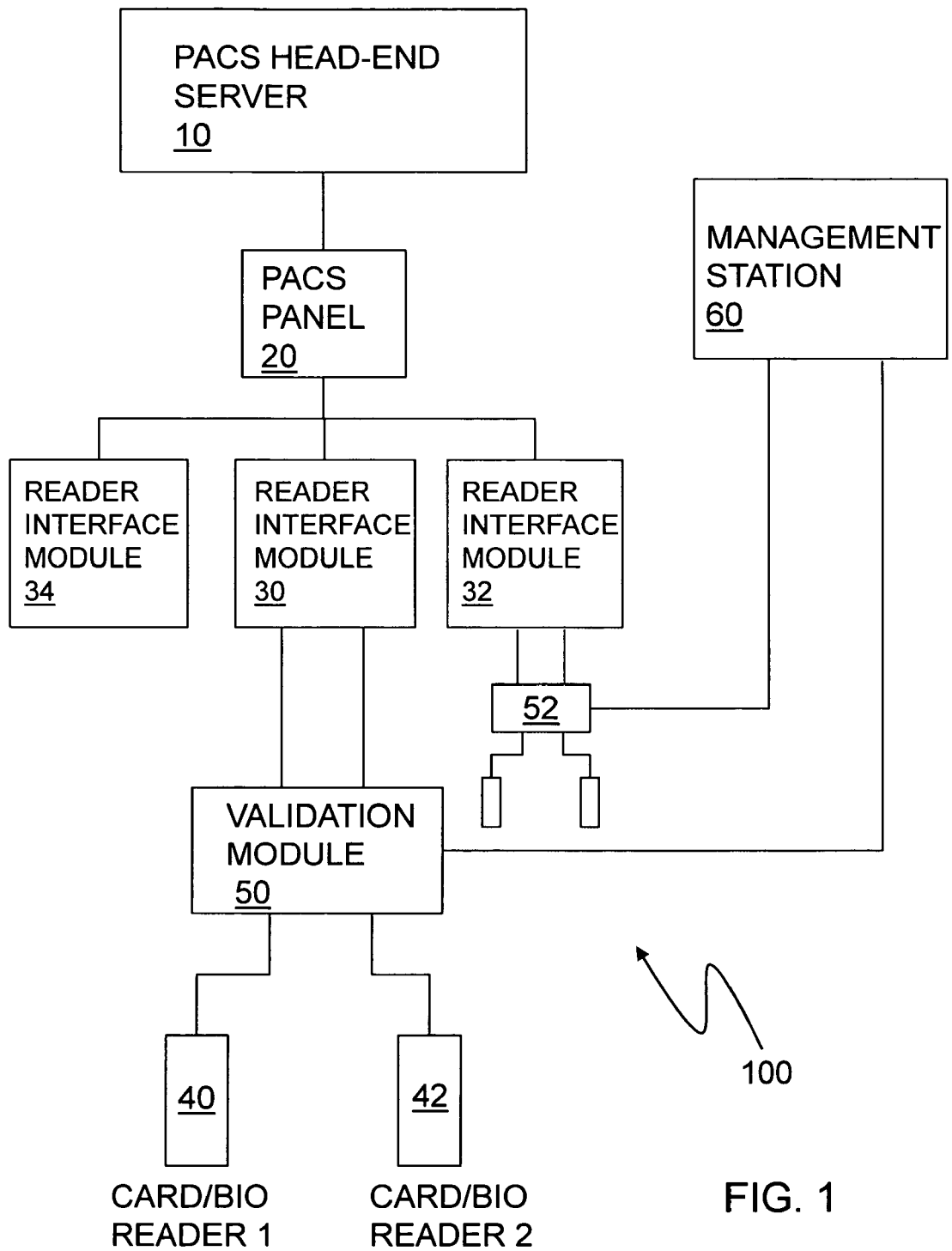
FIG. 1 is a schematic illustration of a physical access control system including a validation module according to an embodiment of the system described herein.

Referring now to the figures of the drawing, the figures comprise a part of this specification and illustrate various embodiments of the described system. It is to be understood that in some instances various aspects of the system may be shown schematically or may be shown exaggerated or altered to facilitate an understanding of the invention.

FIG. 1 is a schematic illustration of a physical access control system (PACS) 100 according to an embodiment of the system described herein. The PACS 100 may be implemented at facility for which access is being controlled, for example, in connection with doors and/or other exterior and/or interior access points of the facility. The PACS 100 may include a PACS head-end server 10 that performs access control management functionality at the facility for which access is being controlled, including, for example, enrollment functions, as further discussed elsewhere herein. A PACS panel 20 may be coupled to the PACS head-end server 10. In an embodiment, the PACS panel 20 may be coupled via an Ethernet connection to the PACS head-end server 10. The PACS panel 20 may include at least one processor that provides access decisions in response to access requests at an access point of the controlled facility. The PACS 100 may include one or more reader interface modules 30, 32, 34 that may each be coupled to one or more card/bio readers 40, 42 (card/bio reader 1 and card/bio reader 2) at one or more access points. In various embodiments, the readers 40, 42 may be contact and/or contactless smart card readers and/or may be biometric readers. The readers 40, 42 may comply with appropriate security specifications, see, for example, TSA's TWIC Reader Hardware And Card Application Specification, discussed elsewhere herein. According to the system described herein, and as further discussed below, a validation module 50 may be coupled between the readers 40, 42 and a corresponding reader interface module (e.g., the reader interface module 30, as illustrated).

The validation module 50 according to the system described herein provides a mechanism to efficiently upgrade a PACS to full HSPD-12 compliance. In accordance with the system described herein, the validation module 50 may provided required security validation functionality. For example, the validation module 50 may provide all of the functionality required by FIPS 201, Special Publication (SP) 800-116, and the TWIC Reader Specification. The validation module 50 may be disposed between the PACS panel 20, via the reader interface module 30, and one or more supported card/biometric readers 40, 42. The validation module 50 may include modular communication interfaces for coupling to the PACS 100, including couplings to the card/bio readers 40, 42 and the reader interface module 30. In an embodiment, the validation module 50 may be coupled via two Wiegand ports (Data0/Data1) to the reader interface module 30, and the readers 40, 42 may be coupled via serial connections, for example two RS-485 serial ports, to the validation module 50. Readers 40, 42 may be selected based on assurance level requirements—for example, contactless or contact readers for low and medium security assurance level areas and full biometric readers for high security assurance areas. As shown in the illustrated embodiment, the validation module 50 may support two readers 40, 42; however, in other embodiments, the validation module 50 may support only one reader or may support more than two readers according to various configurations and specific circumstances.

The validation module 50 may validate cardholder data received from the card/bio readers 40, 42. The cardholder data may include identity credentials and/or other personal identity information. Standards for verification and validation of credentials are set forth in FIPS 201-1. For example, a PIN may be used to control the ability to unlock the card by the cardholder and then supply the embedded credentials for authentication purposes. Authentication of credentials may the use of authentication keys and credentials in connection with a public key infrastructure (PKI) system. A PKI system may include components for the generation of key pairs, the issuance and distribution of digital certificates containing the public key of the cardholder, and management and dissemination of certificate status information. Validation systems that may be used in connection with the system described herein include the use of trusted authorities to generate certificate revocation lists (CRLs) and/or an on-line certificate status protocol (OCSP) system. In a CRL validation system, a trusted authority periodically publishes a signed master list of all valid and/or revoked certificates. An OCSP involves the use of trusted authorities to verify the validation status of each certificate. Various types of OCSP systems that may be used in connection with the system described herein include Traditional OCSP in which a secured, trusted authority directly verifies the validation status of each certificate, and Distributed OCSP that is based on a centralized generation of signed validation proofs that can be published through a network of unsecured responders. For examples and discussions of OCSP certificate revocation systems, see U.S. Pat. No. 5,666,416 to Micali entitled "Certificate Revocation System" and U.S. Pat. No. 5,717,758 to Micali entitled "Witness-Based Certificate Revocation System" which are both incorporated herein by reference.

The validation module 50 according to the system described herein may be implemented without modification or replacement of the PACS. Specifically, the validation module 50 may be incorporated into an existing PACS in a generally universal implementation into an existing PACS. For example, existing reader wiring may be re-used for serial connection of the readers to the validation module 50 and the validation module 50 may be coupled to the existing PACS using an existing Wiegand interface. It is particularly noted that no network connection may be required at the reader according to the system described herein.

In an embodiment, the validation module may be a FIPS-201 F5 hardware module produced by CoreStreet, Ltd. of Cambridge, Mass. The F5 module may be a stand-alone hardware module incorporated onto a circuit board that may be coupled to an access control system without replacing and/or otherwise significantly modifying the access control system in accordance with the implementations as further discussed elsewhere herein. The F5 module may support up to 250,000 cardholders, for example, although other numbers of cardholders, both fewer and greater, may be provided by the system described herein. In various embodiments, the structural and operational characteristics of the F5 module may include: a 2 GB SD memory card; an Ethernet TCP/IP port for connecting to the management station; two RS-485 ports for coupling to the smart card readers; two Wiegand (Data1/Data0) ports for coupling to the access control system (reader interface modules); input power of 8-30 Vdc, 350 mA; reader port output power of 12 Vdc, 350 mA; board size of 13.97 cm×16.51 cm (5.5×6.5 in); an environmental range of 0° C. to 70° C. (32° F. to 158° F.); 0 to 95% RHNC; and a battery-backed real time clock, among other appropriate components, processors, ports, memories, chips etc. to perform the functions discussed elsewhere herein. The F5 module may be compliant with all appropriate regulatory requirements, including, for example, being FCC Class A compliant and RoHS compliant.

The PACS 100 may include multiple validation modules. In FIG. 1, a validation module 52, that may be similar to the validation module 50, is shown with readers coupled thereto and which is shown coupled to the reader interface module 32. Additional validation modules and readers may be also be included, for example, coupled to the reader interface module 34. The multiple validation modules 50, 52 may be managed by a management station 60 that provides centralized control of assurance level settings and distribution of validation data such as card revocations and trusted issuers. In an embodiment, the management station 60 may be an F5 Management Station (F5MS) produced by CoreStreet, Ltd. of Cambridge, Mass. and the validation modules (F5 modules) 50, 52, may be coupled to the management station 60 via an Ethernet connection, for example, via an 256-bit advanced encryption standard (AES) encrypted Ethernet Transmission Control Protocol/Internet Protocol (TCP/IP) connection. After authentication, all TCP ports of the validation module may be closed except for a single port that accepts requests only from the management station 60 after authentication. It is noted, however, that the validation module 50 may function offline if communication with the management station 60 is interrupted. In various embodiments, the management station 60 may include software that runs on MS Windows XP or Server 2003, or other appropriate operating system, and support up to 5,000 validation modules. As further discussed elsewhere herein, the management station 60 may be coupled, via the Internet, to other systems in connection with encryption and revocation functionalities and for purposes of updating software of the access control system.

The validation module 50 may validate cards according to an assurance level setting, extract the badge ID from data on the card, and then pass the badge ID to the PACS panel 20 for an access decision. For invalid cards, the validation module 50 may be configurable to send a preset badge ID to the PACS panel 20 and/or close an output relay. Cardholder data may be captured automatically the first time a card is presented for validation to any reader coupled to the validation module and then stored and distributed to other validation modules by the management station 60. This feature allows enrollment of cardholders using existing PACS enrollment functionality, for example, and/or integration with an identity management system (IDMS) and/or card management system (CMS) and/or with the use of enrollment package, such as visitor software or an enroller module, as further discussed elsewhere herein.

Figure 2:
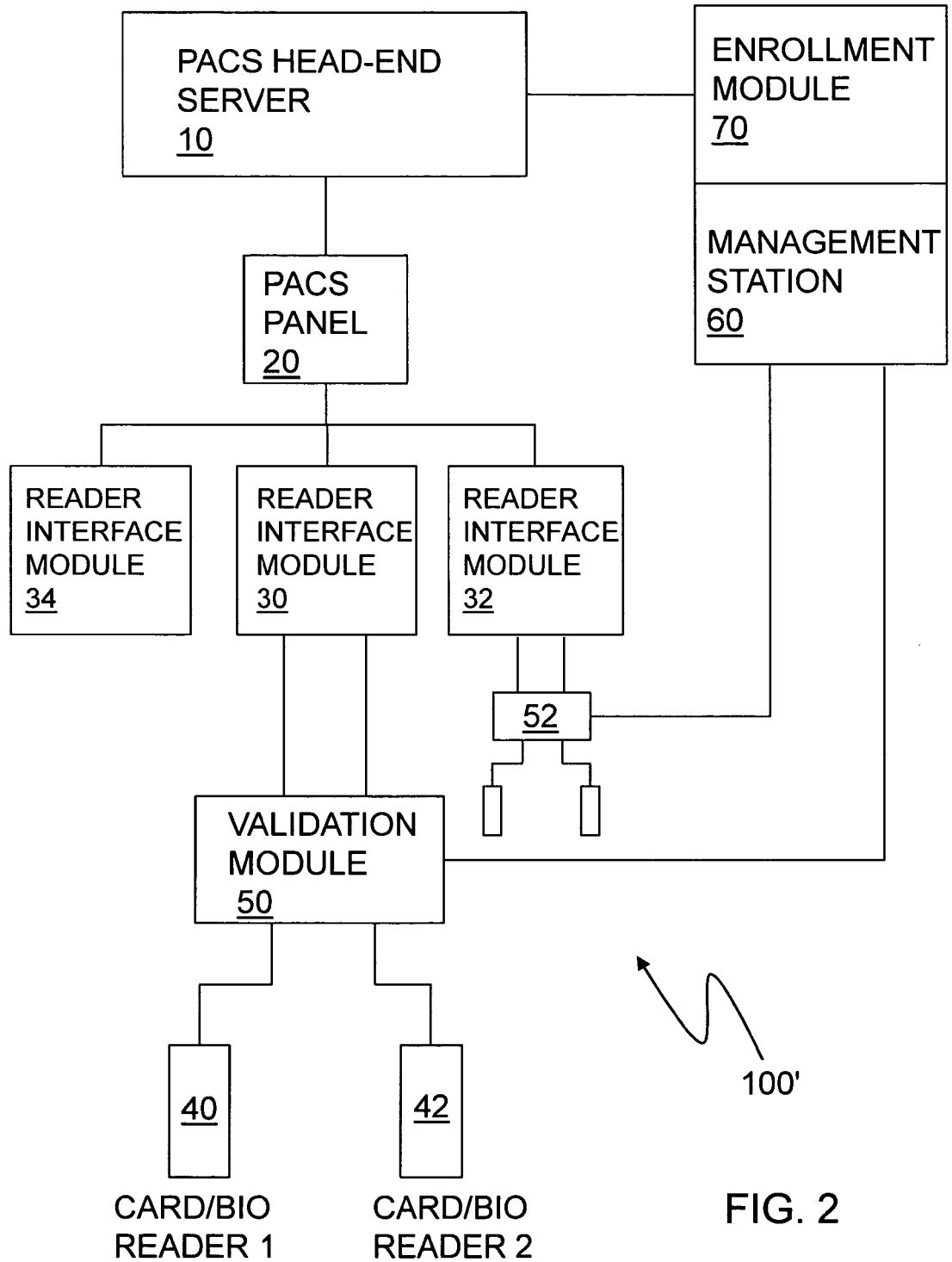
FIG. 2 is a schematic illustration of a physical access control system like that shown in FIG. 1 and further including an enroller module according to another embodiment of the system described herein.

FIG. 2 is a schematic illustration according to an embodiment of the system described herein showing a PACS 100', like the PACS 100, that further includes an enroller module 70. The enroller module 70 may be a software module that provides enrollment functionality. In an embodiment, the enroller module 70 may be an Enroller product produced by CoreStreet, Ltd. of Cambridge, Mass. The enroller module 70 may be coupled to the PACS head-end server 10 and used to enroll new employees, temporary workers and/or contracts in the PACS and process requests in connection with gaining temporary or long-term access to a given facility. In an embodiment, the enroller module 70 may provide for two PKI-related functions. First, the enroller module 70 may provide for authentication when a new user is enrolled in the PACS. Second, the enroller module 70 may control removing access privileges when a user's card (or its digital certificate) is revoked. Accordingly, the enroller module 70 may be used to validate public key certificates and perform certificate path discovery. In an embodiment, the enroller module 70 may perform certificate path validation in accordance with the requirements of the Internet Engineering Task Force's (IETF) RFC 3280, entitled "Internet X.509 Public Key Infrastructure," which is incorporated herein by reference, and perform certificate revocation checking using CRLs and/or OCSP.

Figure 3:
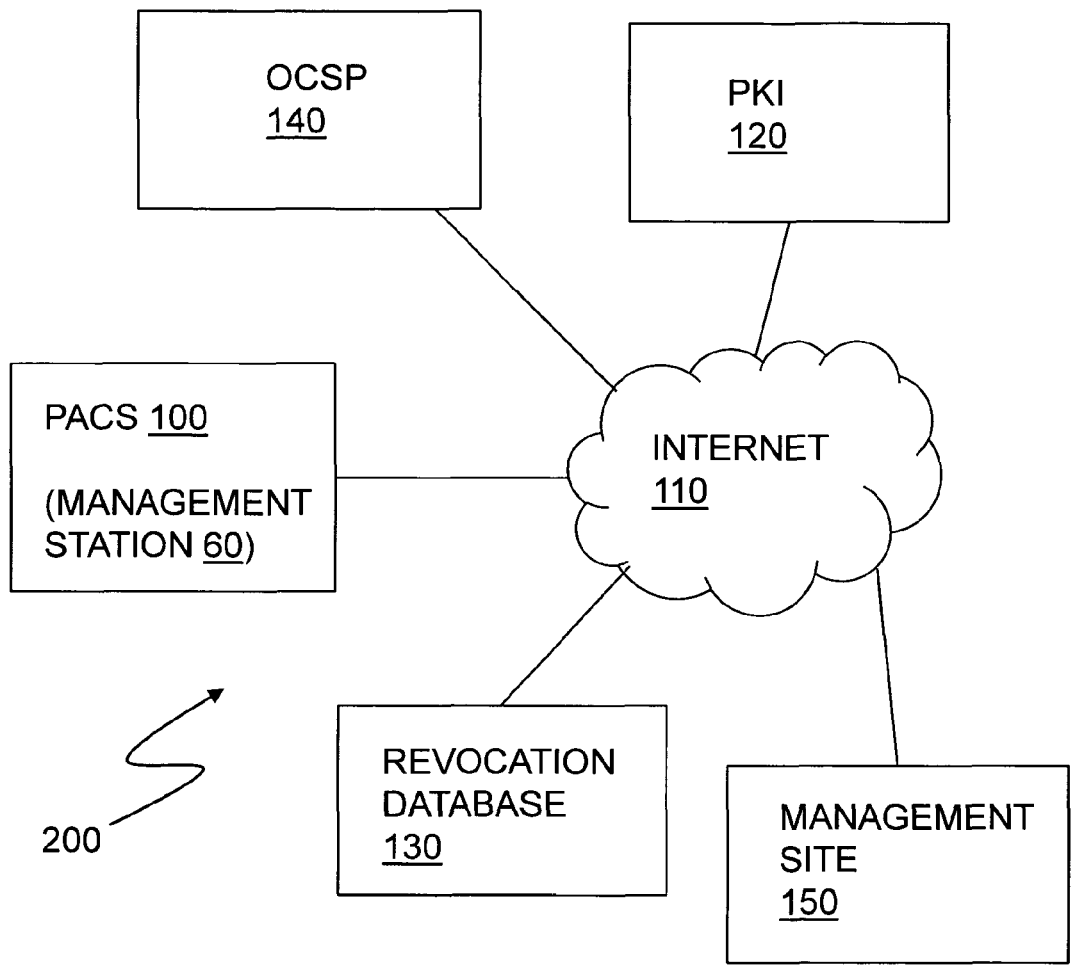
FIG. 3 is a schematic illustration of security architecture coupled via the Internet to an access control system according to an embodiment of the system described herein.

FIG. 3 is a schematic illustration 200 of security architecture coupled to an access control system, such as the PACS 100 and/or PACS 100', according to an embodiment of the system described herein. For example, the management station 60 of the PACS 100 (and/or the PACS 100') may be coupled, via an Ethernet connection, to the Internet 110 and various security architectures and/or systems may be then coupled to the management station 60 via the Internet 110. In an embodiment, the PACS 100 may be coupled, via the Internet 110, to a PKI system, such as a Government PKI system and/or other encryption infrastructure, that may provide for encryption functionality, as further discussed elsewhere herein. For example, the system described herein may perform certificate path discovery and validation to a trusted authority (e.g., Server-based Certificate Validation Protocol (SCVP)) in the Government certified PKI bridge infrastructure to validate inter-agency/inter-company trust for contractors, visitors, etc. Further, a revocation database 130 may provide revocation information to the PACS 100 in connection with revocation of credentials. For example, the revocation database 130 may be a certificate status server that includes a revocation list, such as a CRL and/or the TWIC hot list, among other revocation sources. Alternatively or additionally, the PACS 100 may be coupled to an OCSP system 140 that may include a system and entities for traditional OCSP and/or distributed OCSP, as further discussed elsewhere herein. Further, a management site 150 may be provided that may be used in connection with updating software of the PACS 100. For example, firmware updates may be downloaded to the management station 60 from a web interface of the management site 150, and the firmware updates pushed from the management station 60 one or more (or all) of the validation modules 50, 52 of the PACS 100. The management site 140 may also provide a web interface for the initial configuration of the validation module 50 network settings and hardware options. In an embodiment, the web interface for the initial validation configuration may be enabled and disabled with a dual in-line package (DIP) switch setting.

In an embodiment, the validation module 50 may include a cryptographic module that provides cryptographic services such as encryption authentication, digital signatures and key management according to required security levels. For example, the cryptographic module may conform to the standard set forth in FIPS 140-2, "Security Requirements for Cryptographic Modules," which is incorporated herein by reference. In another embodiment, the system described herein may use RSA BSAFE cryptographic libraries.

According to various embodiments, the system described herein may validate cards at controlled, limited, or exclusion assurance levels as defined in SP 800-116 and support all suitable authentication mechanisms, including: cardholder unique identifier (CHUID), card authentication key (CAK), PIV authentication key (PKI), and/or biometric (BIO) authentication mechanisms and/or any combination thereof (e.g., CHUID, PKI, BIO, CHUID+BIO, PKI+BIO, CHUID+PKI+BIO, etc.). The system described herein may validate TWIC cards at the four authentication modes defined in the TWIC reader specification. As further discussed elsewhere herein, the system described may perform certificate path discovery and validation to a trusted authority (e.g., SCVP) in the Government certified PKI bridge infrastructure to validate inter-agency/inter-company trust for contractors, visitors, etc. In connection with enrollment functionality, the system described herein may capture and store PKI certificates the first time a card is read for periodic path and status validation and/or may capture and store the TWIC Private Key (TPK) the first time a card is read (on the contact interface) to support contactless-only biometric authentication, all without requiring a separate enrollment step. The system described herein may support a range of commercially available card readers for validation at the required assurance level(s), e.g., contact and contactless card-only, card+PIN, card+bio, card+PIN+bio.

Figure 4A:
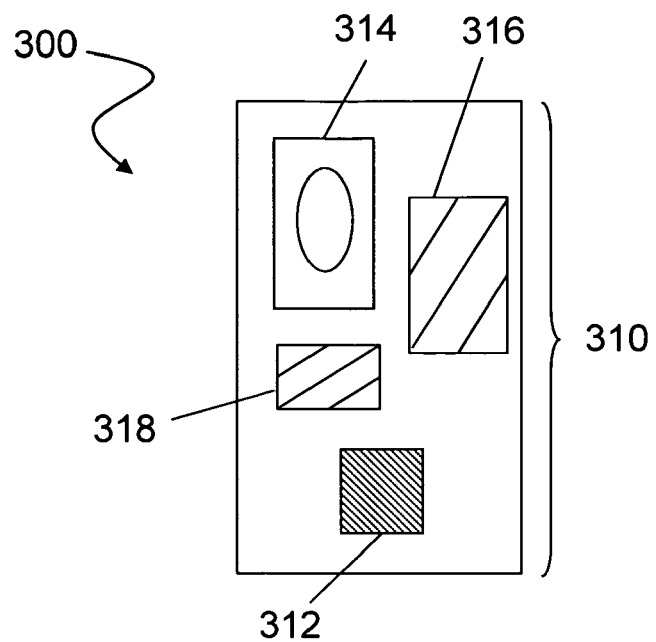
FIGS. 4A and 4B are schematic illustrations of a personal identity verification (PIV) card (front and back) that may be used in connection with the system described herein.
Figure 4B:
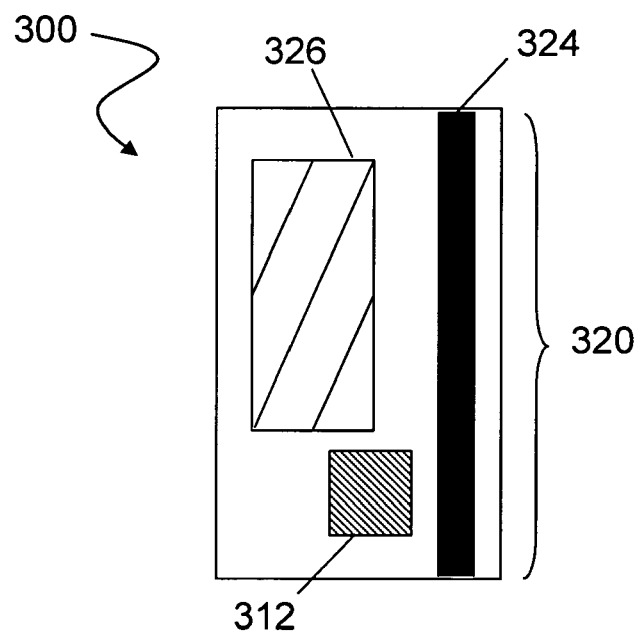

FIGS. 4A and 4B are schematic views of a PIV card 300, showing the front 310 and the back 320 of the card 300, that may be used in connection with the system described herein. The PIV card 300 may include a contact and/or a contactless interface. For example, the card 300 may include a magnetic strip 324 and/or an integrated circuit chip (ICC) 312 that may provide memory capacity and computation capability. The PIV card 300 may include different physical topologies in connection with placements of the magnetic strip 312 and the chip 312 as well as visual information, such as a photograph 314, ID text blocks 316, 318 and/or a bar code or other coded information 326. Data stored on the PIV card 300 may include personal information, certificates, a PIN, biometric data and/or other data. In an embodiment, the PIV card 300 may conform to the standards set forth in FIPS 201-1. Implementation requirements for storage of biometric data on PIV cards may conform to the specifications set forth in NIST Special Publication 800-76-1, Wilson et al., "Biometric Data Specification for Personal Identity Verification," U.S. Dept. of Commerce, January 2007, which is incorporated herein by reference.

Figure 5A:
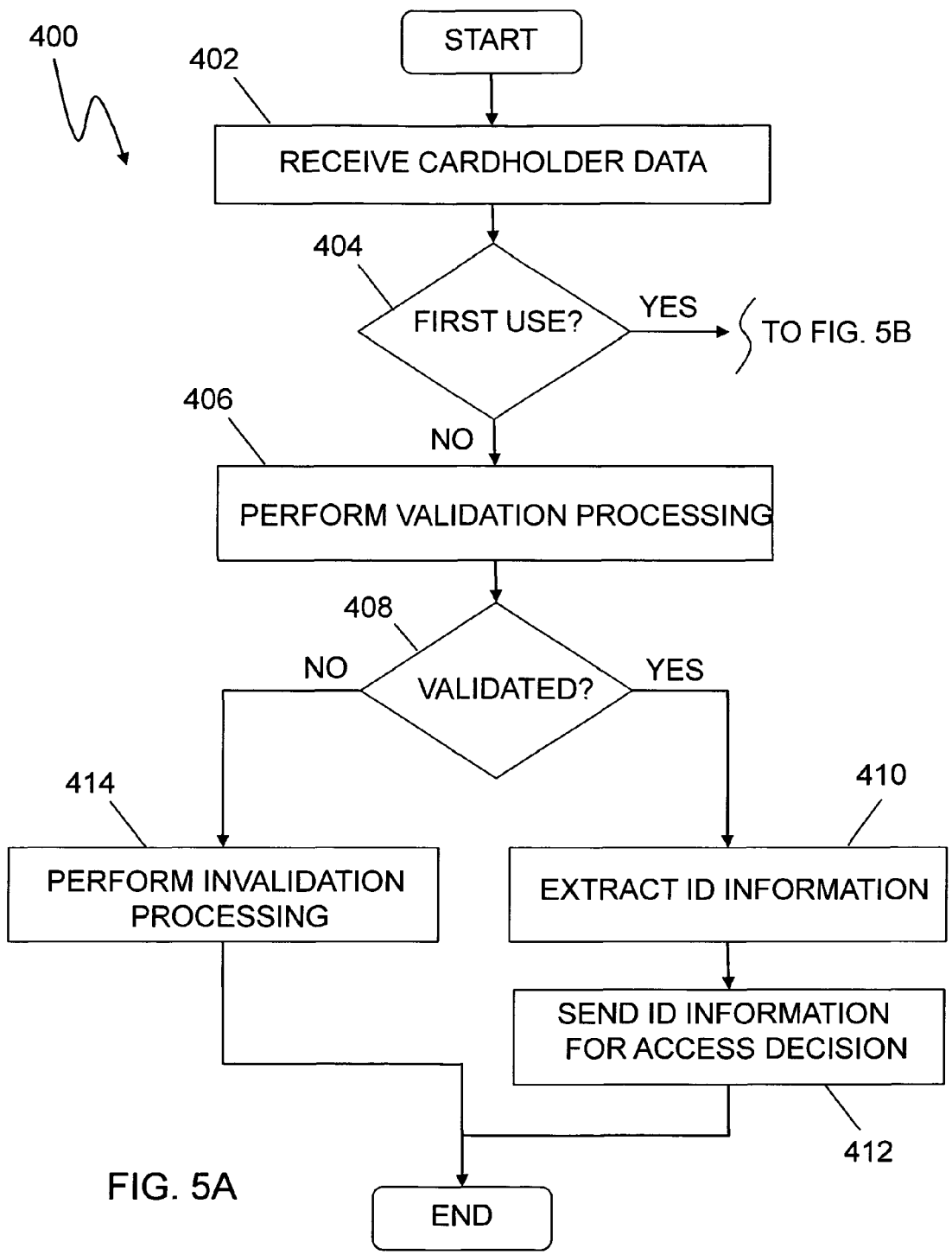
FIGS. 5A and 5B are flow diagrams showing validation and enrollment processing of an access control system according to an embodiment of the system described herein.

FIG. 5A is a flow diagram 400 showing validation processing using the validation module 50 of an access control system (such as the PACS 100 or the PACS 100') according to an embodiment of the system described herein. At a step 402, cardholder data and/or other personal identity information is received from a card and/or biometric scan from the card/bio reader 40 for a user requesting access to facility and/or resource controlled by the access control system. After the step 402, processing proceeds to a test step 404 where it is determined whether it is the first time that the card has been read by the access control system within a designed period for path and status validation. The designated period may be the life of the access control system and/or may be a particular specified time period. If it is determined that card is being read for the first time in the designated period, then processing proceeds to the enrollment processing shown by the flow diagram 450 in FIG. 5B that is further discussed elsewhere herein.

If it is determined at the test step 404 that the card has previously been read within the designated period, then processing proceeds to a step 406 where the validation module 50 performs validation processing on the received cardholder data according to an assurance level setting. After the step 406, processing proceeds to test step 408 where it is determined if the cardholder data is validated according to the system described herein. As further discussed elsewhere herein, the validation processing may include the use of various authentication mechanisms, cryptographic modules and/or a determination of whether the credentials having been revoked, for example by using the Internet to check a CRL and/or other revocation list, and/or perform OCSP validation techniques and may be performed using the management station 60. In various embodiments, the validation processing may provide all validation functionality required by federal standards, for example as set forth in FIPS 201-1, SP 800-116 and/or TWIC Reader specification, among other appropriate security standards. If the cardholder data is validated, then processing proceeds to a step 410 where ID information, such as the badge ID, is extracted from data on the card. After the step 410, processing proceeds to a step 412 where the ID information and an access request is sent, for example, to the PACS panel 20 that will determine whether access is allowed for the requesting user as further discussed elsewhere herein. After the step 412, validation processing is complete.

If it is determined at the test step 408 that the received cardholder data is not validated (i.e. the presented card is invalid), then processing proceeds to a step 414 where invalidation processing is performed. In various embodiments, the invalidation processing may include in some circumstances sending a preset badge ID to the PACS panel 20 and/or closing an output relay and/or other access denial processing, for example. After the step 414, validation processing is complete.

Figure 5B:
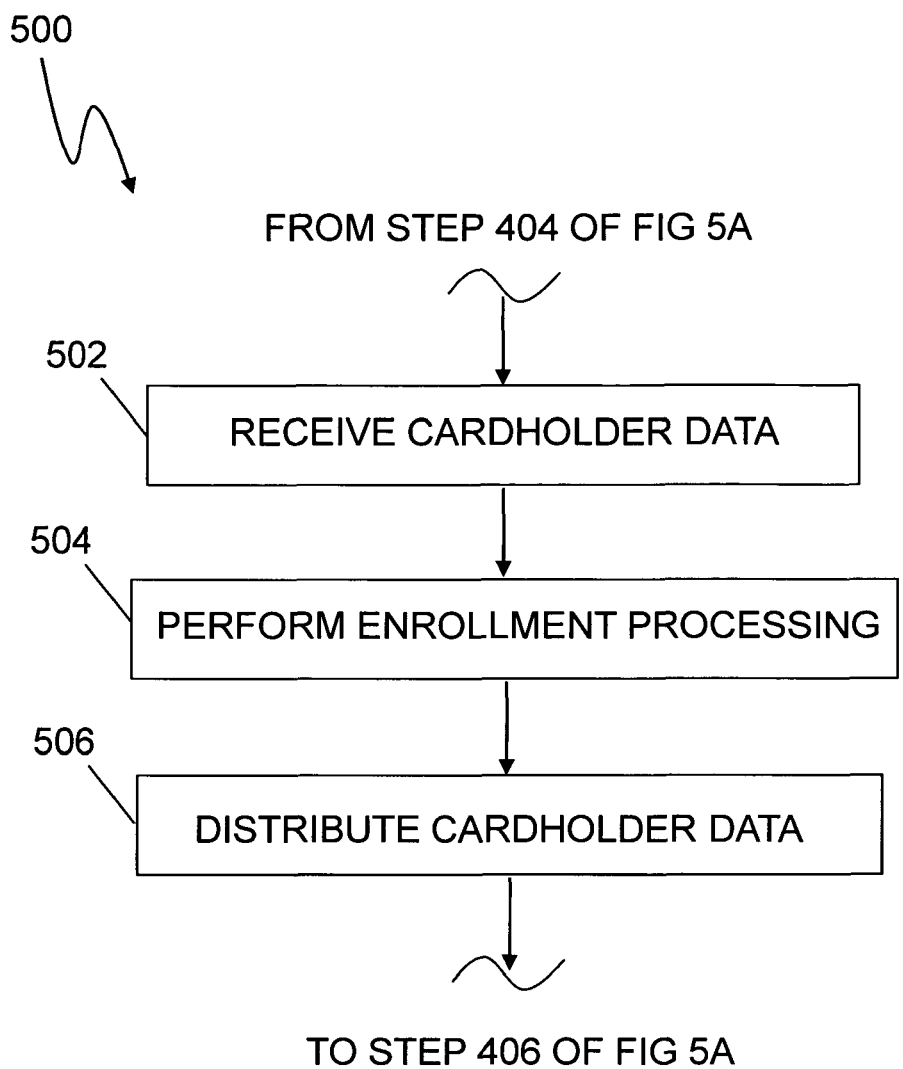

FIG. 5B is a flow diagram 500 showing enrollment processing of the access control system according to an embodiment of the system described herein. At a step 502, the cardholder data is received that has been transmitted in accordance with the processing set forth in FIG. 5A in connection with the first use of a presented card. The new cardholder data may be received by the management station 60 that is coupled to the validation module 50 as further discussed elsewhere herein. After the step 502, processing proceeds to a step 504 where enrollment functionality is performed for the new cardholder data to enroll the new employee or other new user into the access control system. As further discussed elsewhere herein, the enrollment functionality may include processing performed by the PACS server 10 and/or by the enrollment module 70, for example. After the step 504, processing proceeds to a step 506 where the received cardholder data is stored and distributed to other validation modules (for example, the validation module 52) coupled to the management station 60. Thereafter, use of the card at any reader coupled to any of the validation modules 50, 52 of the access control system will indicate the card as having been previously read within the designated period. After the step 456, processing proceeds back to the step 406 discussed with respect to FIG. 5A in connection with validating the cardholder data.

Examples of supported credential types that may be used in connection with the system described herein include: FIPS 201-compliant PIV cards; First Responder Access Card (FRAC); Dept. of Defense Common Access Card (CAC) (legacy, NG, EP); Mariner Administrative Card (MAC); TWIC; U.S. State Department PKI Card; Belgian Certipost eID card; and/or other contact or contactless cards. Additionally, as further discussed elsewhere herein, the system described herein may be used with identification credentials other than cards or smartcards, such as biometric information, electronic transmitters embedded in documents such as passports, etc. Of course, the type of device that controls access may depend upon the type of identification credential that is used. For example, if biometric information is used, then the device used in connection with the system described herein may include a biometric information reader, as further discussed elsewhere herein. The system described herein may be used in connection with the PIVMAN system produced by CoreStreet, Ltd. of Cambridge, Mass. involving mobile secure ID checking (see, e.g., U.S. Patent App. Pub. No. 2008/0016370 A1 to Libin, et al. entitled "Secure ID Checking," which is incorporated herein by reference). It is further noted that embodiments of the system described herein may be applied to any appropriate type of access control systems that control physical and/or electronic access to a facility, physical resource and/or logical resource.

In another embodiment, the system described herein may operate using attributes that are neither in the PACS 100 nor on the presented card 300. For example, a secure vaulted computer may receive user information from vaulted databases, including public identification information concerning revocations of users' access and non-public information such as attributes (or privileges) of the users. The secure vaulted computer may be part of an Identity and Privilege List (IPL) Publisher infrastructure such as that discussed in above-noted U.S. Patent App. Pub. No. 2008/0016370 A1 to Libin, et al. The IPL Publisher may carry attributes related to first responders that are registered with a particular agency, such as DHS-FEMA. If, for example, a first responder's PIV or TWIC card were used to attempt access at a facility entrance at which he/she would normally not be granted access based on local authority, the presence of the first responder attribute as vouched for by the particular agency could override the default behavior and allow access. In practice, for example, federally registered HazMat or Firefighting-qualified individuals could be granted access to any Federal building in the country that had deployed a system according to that described herein that is configured to allow access to such registered individuals, while still disallowing access to other valid cardholders of a similar type (e.g., PIV and/or TWIC).

Various of the embodiments discussed herein may be combined with each other in appropriate combinations in connection with the system described herein. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A validation device for an access control system, comprising:

modular communication interfaces that provide coupling to the access control system, the modular communication interfaces including a first communication port that couples to at least one reader of the access control system and enables the validation device to receive the cardholder data from the at least one reader; and a second communication port that couples to the access decision component of the access control system and enables the validation device to send the extracted ID information to the access decision component;

at least one processor; and a computer readable storage medium storing executable code that is executable by the at least one processor, the computer readable storage medium including:

executable code that receives cardholder data in connection with an access request at an access point controlled by the access control system;

executable code that validates the cardholder data using an Internet connection to access a remote revocation database that indicates if credentials corresponding to cardholder data have been revoked, wherein the executable code that validates the cardholder data includes executable code that authenticates the cardholder data according to an authentication mechanism;

executable code that, after validation of the cardholder data, extracts ID information from the validated cardholder data; and executable code that sends the extracted ID information to an access decision component of the access control system that determines whether access is granted for a cardholder corresponding to the extracted ID information.

2. The validation device according to claim 1, wherein the modular communication interfaces further include:

a third communication port that couples to a management station.

3. The validation device according to claim 2, wherein the computer readable storage medium further includes:

executable code that exchanges information with the management station.

4. The validation device according to claim 1, wherein the authentication mechanism is at least one of: cardholder unique identifier (CHUID), card authentication key (CAK), PIV authentication key (PKI), and biometric authentication (BIO).

5. The validation device according to claim 1, wherein the executable code that validates the cardholder data performs certificate path discovery and validation to a trusted authority.

6. The validation device according to claim 1, the computer readable storage medium further including:

executable code that performs enrollment processing for cardholder data that is identified as being used for a first time with the access control system.

7. The validation device according to claim 6, wherein the enrollment processing includes capturing and storing certificates of the cardholder data that is identified as being used for the first time.

8. An access control system, comprising:

an access decision component that controls access through an access point;

a reader disposed at the access point that extracts cardholder data from a credential presented at the access point;

a validation module coupled to the reader and the access decision component, wherein the validation module includes:

modular communication interfaces that couple the at least one validation module to the access decision component, the modular communication interfaces including a first communication port that couples the validation module to the reader and enables the validation module to receive the cardholder data from the reader; and a second communication port that couples the validation module to the access decision component and that enables the validation module to send the extracted ID information to the access decision component;

at least one processor; and a computer readable storage medium storing executable code executable by the at least one processor, the computer readable storage medium including:

executable code that receives the cardholder data from the reader;

executable code that validates the cardholder data using an Internet connection to access a remote revocation database that indicates if credentials corresponding to cardholder data have been revoked;

executable code that, after validation of the cardholder data, extracts ID information from the validated cardholder data; and executable code that sends the extracted ID information to the access decision component that determines whether access is granted for a cardholder corresponding to the extracted ID information.

9. The access control system according to claim 8, further comprising:

a management station coupled to the validation module and coupled to at least one additional validation module, wherein the management station manages information distributed between the validation module and the at least one additional validation module.

10. The access control system according to claim 8, further comprising:

an enrollment module that performs enrollment processing for cardholder data that is identified as being used for a first time with the access control system.

11. The validation device according to claim 1, wherein an attribute is from a source different from both the access control system and the cardholder data presented by the cardholder.

12. The access control system according to claim 8, wherein an attribute is from a source different from both the access control system and the cardholder data presented by the cardholder.

* * * * *